United States Patent
Kim et al.

(10) Patent No.: US 8,095,723 B2
(45) Date of Patent: Jan. 10, 2012

(54) LOG-BASED FLASH TRANSLATION LAYER AND OPERATING METHOD THEREOF

(75) Inventors: Soo Young Kim, Seoul (KR); Sung In Jung, Daejoen (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1083 days.

(21) Appl. No.: 11/675,629

(22) Filed: Feb. 16, 2007

(65) Prior Publication Data

US 2008/0201518 A1    Aug. 21, 2008

(51) Int. Cl.
G06F 12/00    (2006.01)
G06F 13/00    (2006.01)
G06F 13/28    (2006.01)

(52) U.S. Cl. ........................................................ 711/103

(58) Field of Classification Search .................... 711/103
See application file for complete search history.

(56) References Cited

U.S. PATENT DOCUMENTS

| | | | |
|---|---|---|---|
| 5,937,425 A | 8/1999 | Ban | |
| 2006/0047920 A1* | 3/2006 | Moore et al. | 711/154 |
| 2006/0179263 A1* | 8/2006 | Song et al. | 711/170 |
| 2006/0212674 A1* | 9/2006 | Chung et al. | 711/202 |

OTHER PUBLICATIONS

Kim, J. et al., "A Space-Efficient Flash Translation Layer for Compactflash Systems," *IEEE Trans. Consum. Electronics*, 48(2):366-375 (May 2002).

* cited by examiner

*Primary Examiner* — Kevin Ellis
*Assistant Examiner* — Chad Davidson

(57) ABSTRACT

A log-based FTL and an operating method thereof for improving performances of reading and writing operations to increase the lifetime of a flash memory. In the method, when a reading operation for an LBN and an LPN is requested, a PBN and a PPN corresponding to the LBN and the LPN are calculated with reference to a pagemap corresponding to the LBN. A physical page of a physical block corresponding to the PBN and the PPN is accessed so that a reading operation is performed. On the other hand, when a writing operation for the LBN and the LPN is requested, a PBN and a PPN for a free-page of a physical block last assigned for the LBN are calculated with reference to a blockmap. The physical page of the physical block corresponding to the PBN and the PPN is accessed, so that a writing operation is performed. The pagemap stores a PBN and a PPN, and the blockmap stores a PBN list and a PPN.

20 Claims, 8 Drawing Sheets

LOG-BASED FLASH TRANSLATION LAYER AND OPERATING METHOD THEREOF

BACKGROUND OF THE INVENTION

1. Field of the Invention

The present invention relates to a flash memory system, and, more particularly, to a log-based FTL and an operating method thereof, capable of improving performances of a reading operation, a writing operation, and an erasing operation, and extending life of a flash memory.

2. Description of the Related Art

The flash memory, which is one of non-volatile memories, has advantages of both a read only memory (ROM) capable of conserving data even without power and a random access memory (RAM) for freely inputting and outputting data. Also, the flash memory consumes less power than a hard disk, stably conserves stored data against severe impact or vibration, has a small size and lightweight, and has a fast access speed.

Despite the above-described advantages, the flash memory has a problem that a writing operation cannot be performed on a space on which a writing operation has been already performed due to its hardware characteristics. That is, an erasing operation for emptying a relevant space should be performed first in order to perform a writing operation again on a space already used. Also, the flash memory has a problem that a writing operation and an erasing operation cannot be performed continuously because a unit of the writing operation is different from that of the erasing operation.

For example, a general flash memory has a plurality of blocks including physical pages of 32 or 64. A reading operation and a writing operation are performed by a physical page unit, but an erasing operation is performed by a block unit. As known from the above description, units by which the reading and writing operations are performed are different from a unit by which the erasing operation is performed, so that the writing operation and the erasing operation cannot be performed continuously.

The above described problems not only make using a flash memory as a main memory difficult but also make directly utilizing a file system for a general hard disk difficult even when a flash memory is used as an auxiliary memory device as illustrated in FIG. 1.

Therefore, according to a prior art, a flash memory system has a flash translation layer (FTL) 110 located between a flash memory 100 and a file system 120, the FTL 110 provides to map a logical address generated by the file system 120 into a physical address of the flash memory 100.

At this point, the FTL 110 can be realized in the form of an independent hardware physically separated from a host device, or in the form of a device driver mounted inside the host device.

The above-described address translation function of the FTL allows the host device (not shown) to recognize the flash memory 100 as an auxiliary memory device such as a hard disk and to access the flash memory 100 in the same manner as in the hard disk.

FIG. 2 is a view explaining a method for operating a flash memory system including an FTL according to an embodiment of the prior invention.

Referring to FIG. 2, the FTL 210 includes a blockmap in which mapping relationship between logical addresses and physical addresses. A flash memory 220 includes two kinds of blocks of a data block and a replacement block. At this point, the number of replacement blocks corresponding to one data block is not limited.

Accordingly, the FTL 210 obtains a physical address (PBN=0, offset=1) corresponding to a logical address (LBN=1, Offset=1) with reference to the blockmap. But, when a relevant region is invalid, the FTL 210 accesses Offset=1 of a replacement block (block 5) corresponding to a data block (block 0).

However, since the FTL 210 of FIG. 2 assigns a new replacement block whenever the same offset is obtained, and an erasing operation is performed on a physical page not used when there is no replacement block that can be assigned. Therefore, there has been a problem that utilization of a replacement block reduces.

Accordingly, a space-efficient FTL is proposed to reduce a space of the flash memory that is unnecessarily wasted by the FTL of FIG. 2.

FIG. 3 is a view explaining a method for operating a flash memory system including a space-efficient FTL according to a prior art.

Referring to FIG. 3, the space-efficient FTL 310 uses a hybrid method including a blockmap for translating a logical address and a pagemap for using a log-scheme for a frequently updated block. The flash memory 320 includes two kinds of blocks of a data block and a Logblock. The data block (block 0) stores general data, and the Logblock (block 5) temporarily stores frequently updated data.

Accordingly, the space-efficient FTL 310 obtains a physical address (PBN=0, offset=1) corresponding to a logical address (LBN=1, Offset=1) with reference to the blockmap. But, when a relevant region is invalid, the FTL 310 accesses PPN=0 of the Logblock (block 5) corresponding to a data block (block 0) with reference to the pagemap.

Since the space-efficient FTL assigns and uses a Logblock instead of a replacement block, it should merge a data block and a Logblock when the Logblock is filled completely.

However, a great number of reading and writing operations occurs during a merging operation at this point, and the number of erasing operations naturally increases according to increses the number of writing operations occur.

Therefore, the lifetime of flash memory is reduced.

SUMMARY OF THE INVENTION

The present invention has been made to solve the foregoing problems of the prior art and therefore an object of the present invention is to provide a log-based FTL and an operating method thereof, capable of maximizing lifetime of flash memory while reducing the space of flash memory the number of reading, writing, and erasing operations.

According to an aspect of the invention, the invention provides a method for operating a log-based FTL. The method includes: when a reading operation for an LBN(logical block number) and an LPN (logical page number) is requested, calculating a PBN (physical block number) and a PPN (physical page number) corresponding to the LBN and the LPN with reference to a pagemap corresponding to the LBN, and accessing a physical page of a physical block corresponding to the PBN and the PPN to perform a reading operation; and when a writing operation for the LBN and the LPN is requested, calculating a PBN and a PPN for a freepage of a physical block last assigned for the LBN with reference to a blockmap, and accessing the physical page of the physical block corresponding to the PBN and the PPN to perform a writing operation, wherein the pagemap stores a PBN and a PPN corresponding to each of a plurality of LPNs subjected to the corresponding LBN, and the blockmap stores a PBN list of physical blocks sequentially assigned, and a PPN for a free-page of a physical block last assigned for the corresponding LBN, for each LBN.

According to another aspect of the present invention, there is provided a log-based FTL including: a plurality of pagema generated to correspond to a plurality of LBN (logical block number)s, respectively, to store PBN(Physical block number)s and PPN(Physical Page number)s corresponding to respective LPN(logical Page number)s subjected to the corresponding LBNs; a blockmap for storing a PBN list of physical blocks sequentially assigned, and a PPN for a free-page of a physical block last assigned for the corresponding LBN, for each LBN; and a processor for performing an address translation operation with reference to the pagemap during a reading operation, and performing an address translation operation with reference to the blockmap during a writing operation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
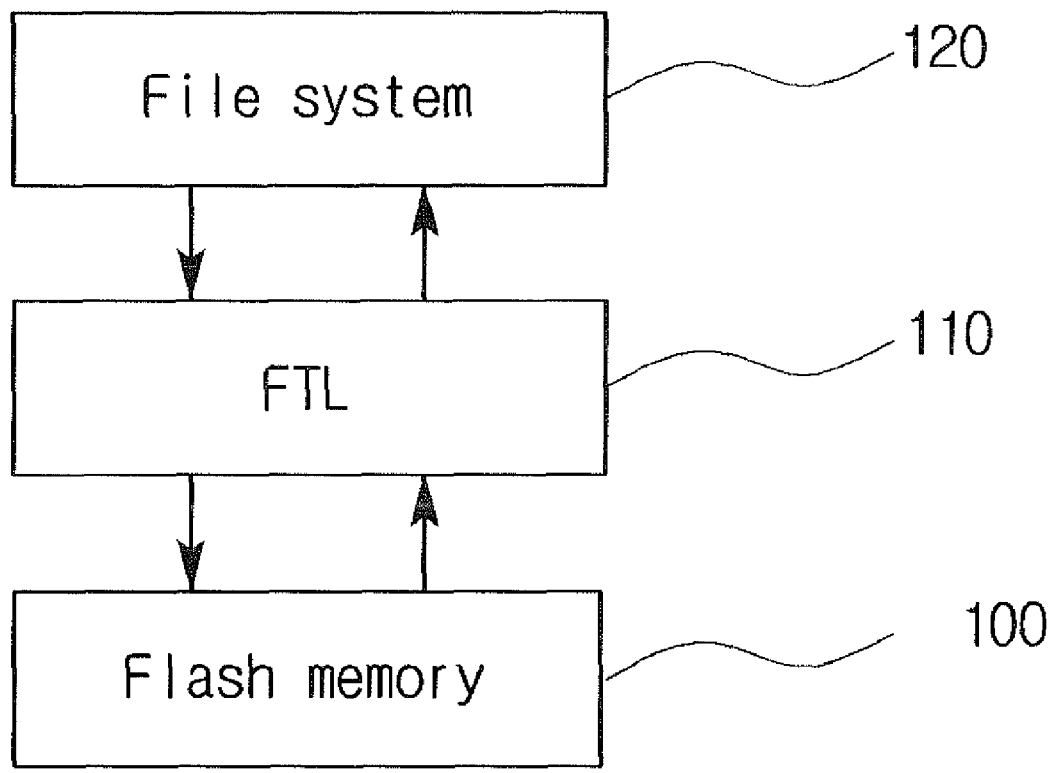
FIG. 1 is a view illustrating a general data managing apparatus.
Figure 2:
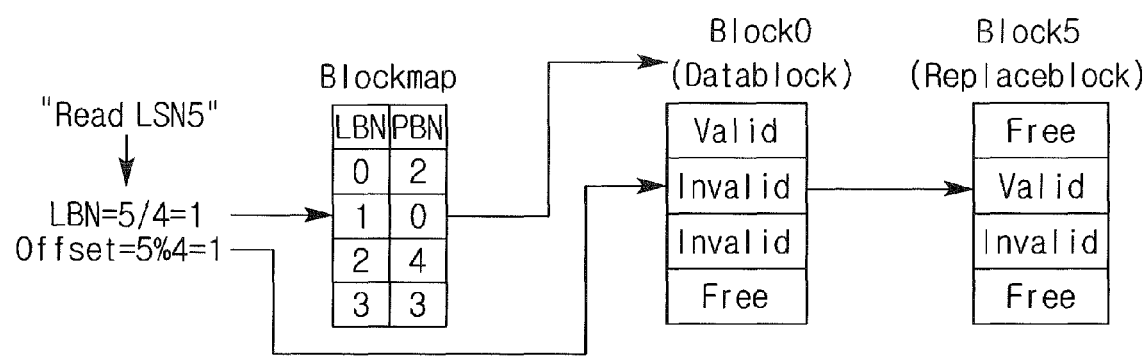
FIG. 2 is a view illustrating a construction of a flash memory system according to an embodiment of a prior art.
Figure 3:
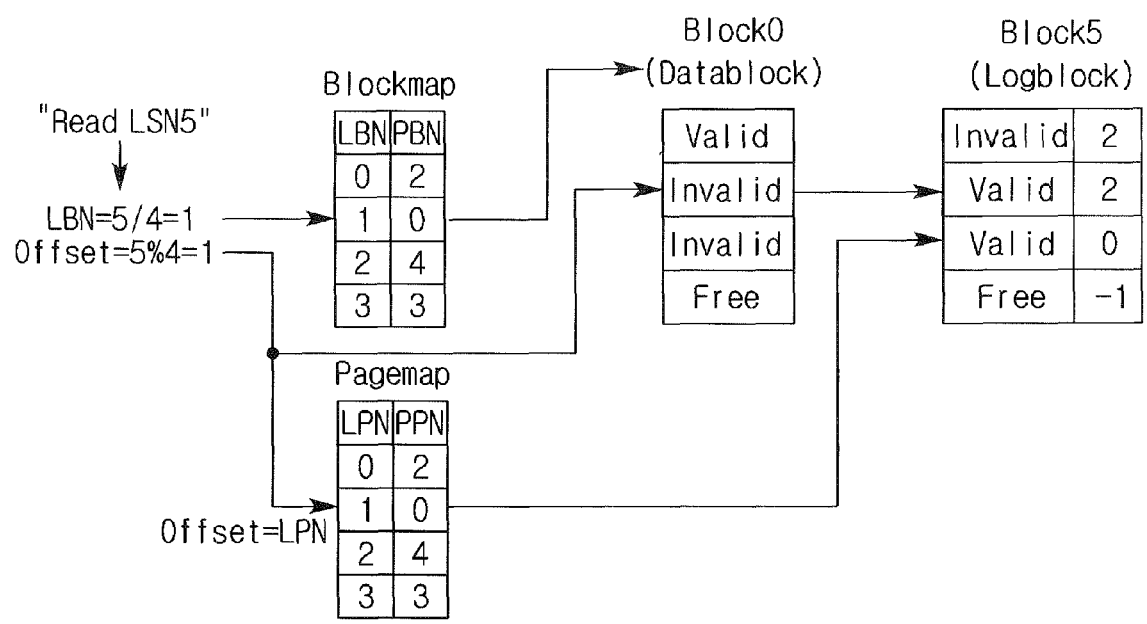
FIG. 3 is a view illustrating a construction of a flash memory system according to an embodiment of a prior art.

Certain or exemplary embodiments of the present invention that can be easily carried out by a person of ordinary skill in the art will now be described in detail with reference to the accompanying drawings. However, in description of operation principles associated with the embodiments of the present invention, detailed description of a known art or construction is omitted because it may obscure the spirit of the present invention unnecessarily.

Also, the same reference numerals are used for parts performing similar functions and operations through the drawings.

Figure 4:
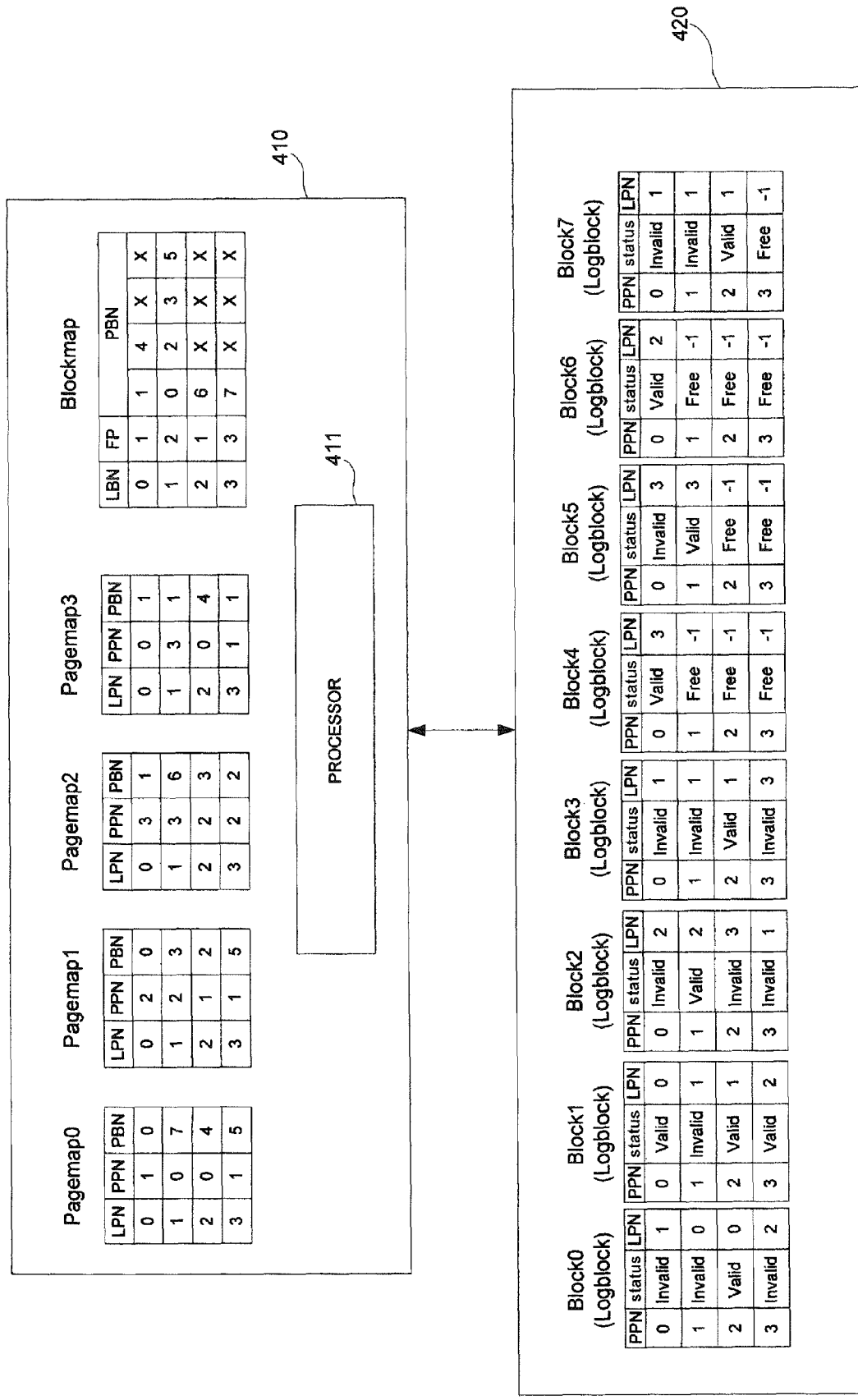
FIG. 4 is a view illustrating a construction of a flash memory system according to an embodiment of the present invention.

FIG. 4 is a view illustrating a construction of a flash memory system according to an embodiment of the present invention.

Referring to FIG. 4, the flash memory system includes a log-based FTL 410 and a flash memory 420. The log-based FTL 410 includes a plurality of pagema (pagemap0-pagemap3), one blockmap, and a processor 411, and the flash memory 420 includes a plurality of physical blocks (block0-block7).

A plurality of pagema (pagemap0-pagemap3) correspond to a plurality of Logical Block Number (LBN). Also, the plurality of pagema (pagemap0-pagemap3) are generated when a reading operation is performed on the corresponding LBNs to store Physical Block Number (PBN) and Physical Page Number (PPN) corresponding to the Logical Page Number (LPN), respectively, subjected to the corresponding to the LBNs.

At this point, all of the plurality of pagema (pagemap0-pagemap3) are not continuously stored inside the log-based FTL 410 but generated when a reading operation is performed and stored in the log-based FTL 410 for only a limited period. That is, the log-based FTL 410 has a characteristic of storing only a pagemap corresponding to an LBN on which a reading operation has been performed recently.

The blockmap stores a PBN list of physical blocks sequentially assigned and a PPN of a free-page of a physical block last assigned for a corresponding LBN.

At this point, since the PBN list has a PBN for the physical blocks sequentially assigned for the corresponding LBN, a first PBN becomes the PBN of a physical block first assigned for the corresponding LBN, and a last PBN becomes the PBN of a physical block last assigned for the corresponding LBN. Consequently, the PPN of a free-page of the physical block last assigned becomes a free-page of a physical block on which a writing operation is to be performed.

The processor 411 performs the address translation operation with reference to the pagema or blockmap. When a reading operation is requested, the processor 411 obtains an LBN and an LPN from Logical Sector Number (LSN) provided by file system, calculates a PBN and a PPN corresponding to the LBN and the LPN with reference to a pagemap corresponding to the obtained LBN, and accesses a physical page of a corresponding physical block to perform a reading operation. On the other hand, when a writing operation is requested, the processor 411 obtains an LBN and an LPN as a read operation, calculates a PBN and a PPN corresponding to the LBN with reference to a blockmap, and accesses a physical page of a corresponding physical block.

The flash memory 420 includes a plurality of physical blocks (block0-block7), and each of the plurality of physical blocks (block0-block7) includes a plurality of physical pages storing an LPN of a corresponded logical page and information for notifying validity or use.

At this point, the physical page is referred to as a valid page when valid data is stored therein, referred to as an invalid page when invalid data is stored therein, and referred to as a free page when no data is stored therein.

Since the flash memory 420 is formatted by a log-based FTL 410 to use the physical block as Logblock, the PBN and PPN are assigned to the plurality of physical blocks and physical pages having block offset and page offset value, data is sequentially stored in PPN order.

Figure 5:
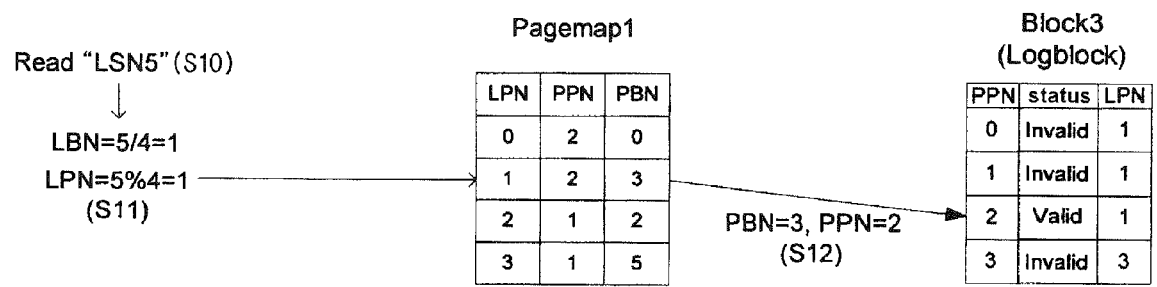
FIG. 5 is a view explaining a reading operation method of the log-based FTL of FIG. 4.

FIG. 5 is a view explaining a reading operation method of the log-based FTL of FIG. 4. It is assumed that the number of logical blocks is four in FIG. 5.

First, when a file system generates a command of "Read LSN 5" (S10), the log-based FTL 410 divides the LSN "5" by the number of logical blocks "4" to obtain quotient of 1 as an LBN and a remainder of 1 as an LPN (S11).

The log-based FTL 410 calculates physical addresses, that is, a PBN=3 and a PPN=2, corresponding to an LBN=1 and LPN=1 with reference to a pagemap1 corresponding to the LBN=1 obtained in S11. Then, the log-based FTL 410 accesses a page2 of a physical block3 having a PBN=3 and a PPN=2 to read data (S12).

Figure 7:
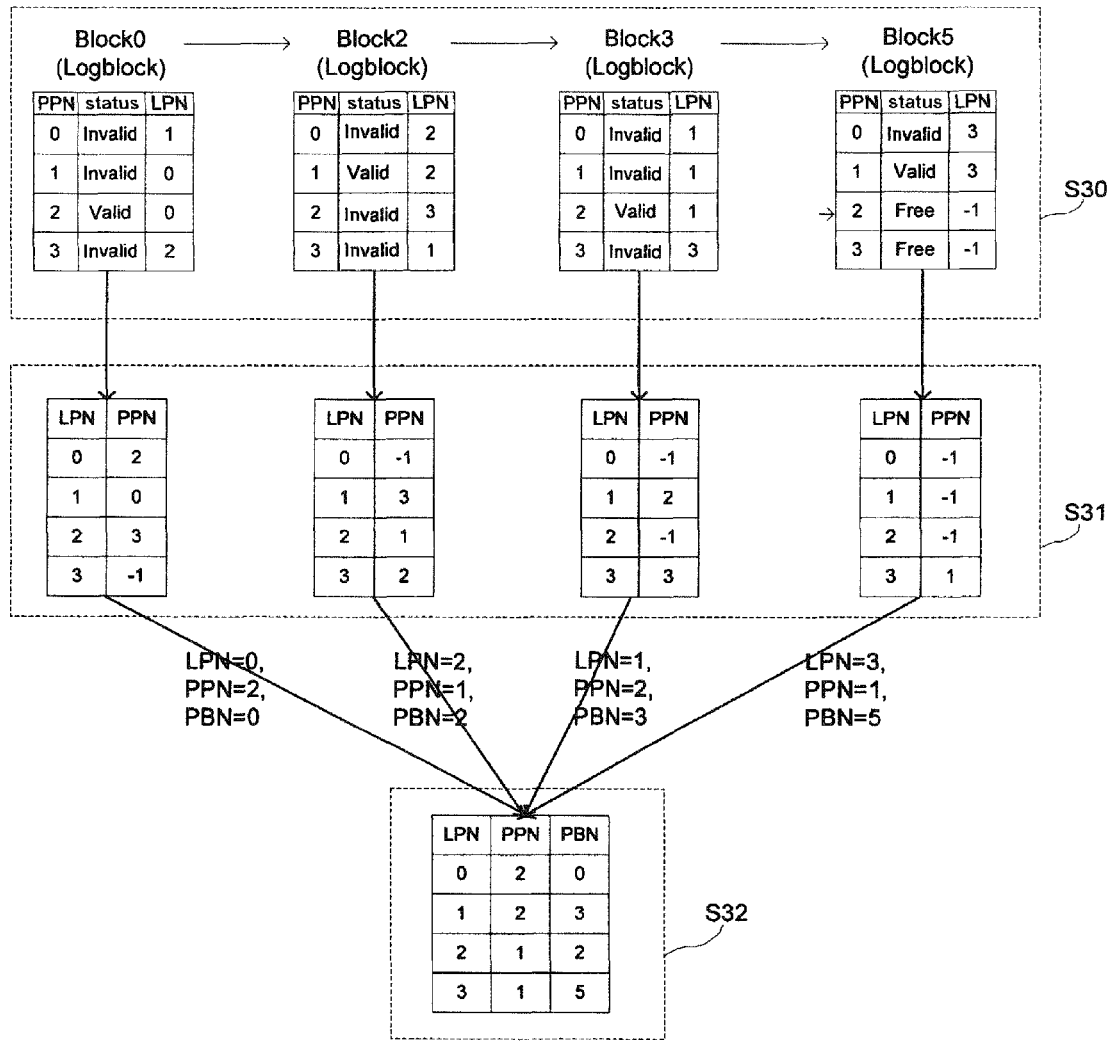
FIG. 7 is a view explaining a pagemap forming method of the log-based FTL of FIG. 4.

When a reading operation for an LBN=1 is performed for the first time or after a long time and a pagemap1 corresponding to the LBN=1 is absent, the log-based FTL 410 performs the pagemap forming method of FIG. 7 first to form the pagemap1 corresponding to the LBN=1, and performs operation S12.

Figure 6:
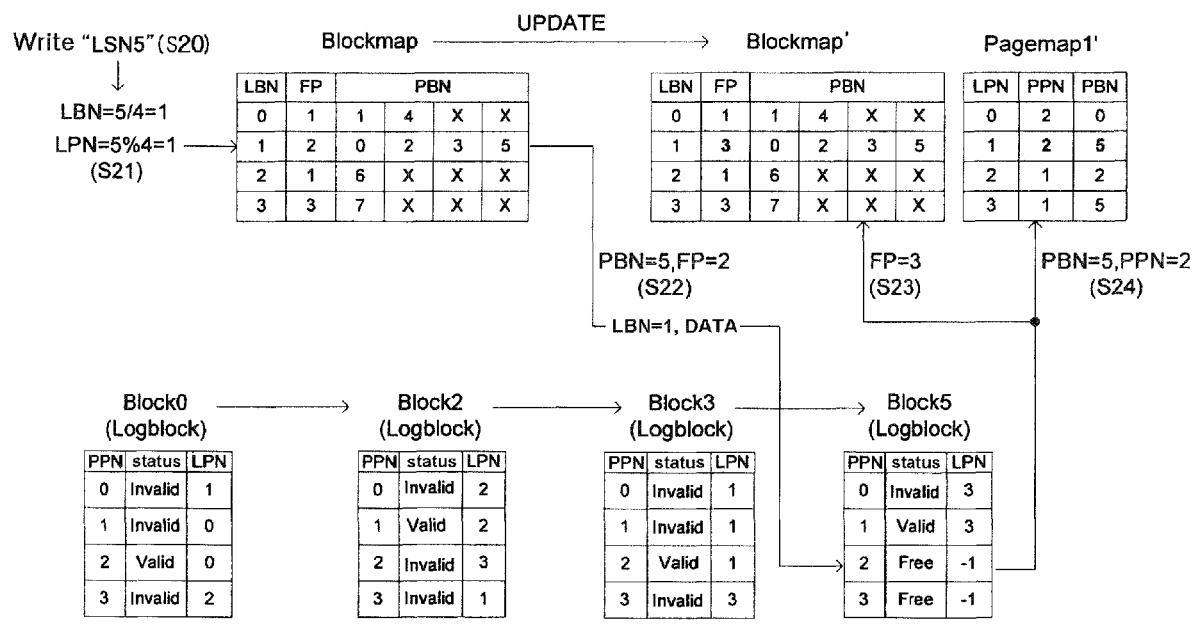
FIG. 6 is a view explaining a writing operation method of the log-based FTL of FIG. 4.

FIG. 6 is a view explaining a writing operation method of the log-based FTL of FIG. 4. It is assumed that the number of logical blocks is four also in FIG. 6.

When the file system generates a command of "Write LSN 5" (S20), the log-based FTL 410 obtains an LBN=1 and an LPN=1 using the same method of FIG. 5 (S21).

The log-based FTL 410 calculates physical addresses, that is, a PBN=5 and a PPN=2, for a last block of a PBN list and a free-page FP thereof corresponding to an LBN=1 with reference to a blockmap. Then, the FTL 410 accesses a physical page2 of a physical block5 having a PBN=5 and a PPN=2 to write data and an LPN=1 (S22).

Also, when a writing operation is completed, the log-based FTL 410 reflects an operation result in S22 to update the blockmap (S23) and simultaneously, updates a pagemap1 in order to perform next writing operation and reading operation (S24).

For S23, the log-based FTL 410 newly obtains a free-page existing within a physical block on which a writing operation has been performed, and updates a physical address of the free-page, i.e., PBN=5, PPN=3 on the blockmap. Accordingly, when a command of "write LSN5" is generated again, the log-based FTL 410 accesses a physical page3 of a physical block5 instead of a physical page2 of the physical block5 according to the updated blockmap to perform a writing operation.

On the other hand, when there is no more free-page within the physical block5 on which the writing operation has been performed, the log-based FTL 410 assigns a new physical block and updates a PBN and a PPN of the new physical block and a free-page thereof on the blockmap.

Figure 8:
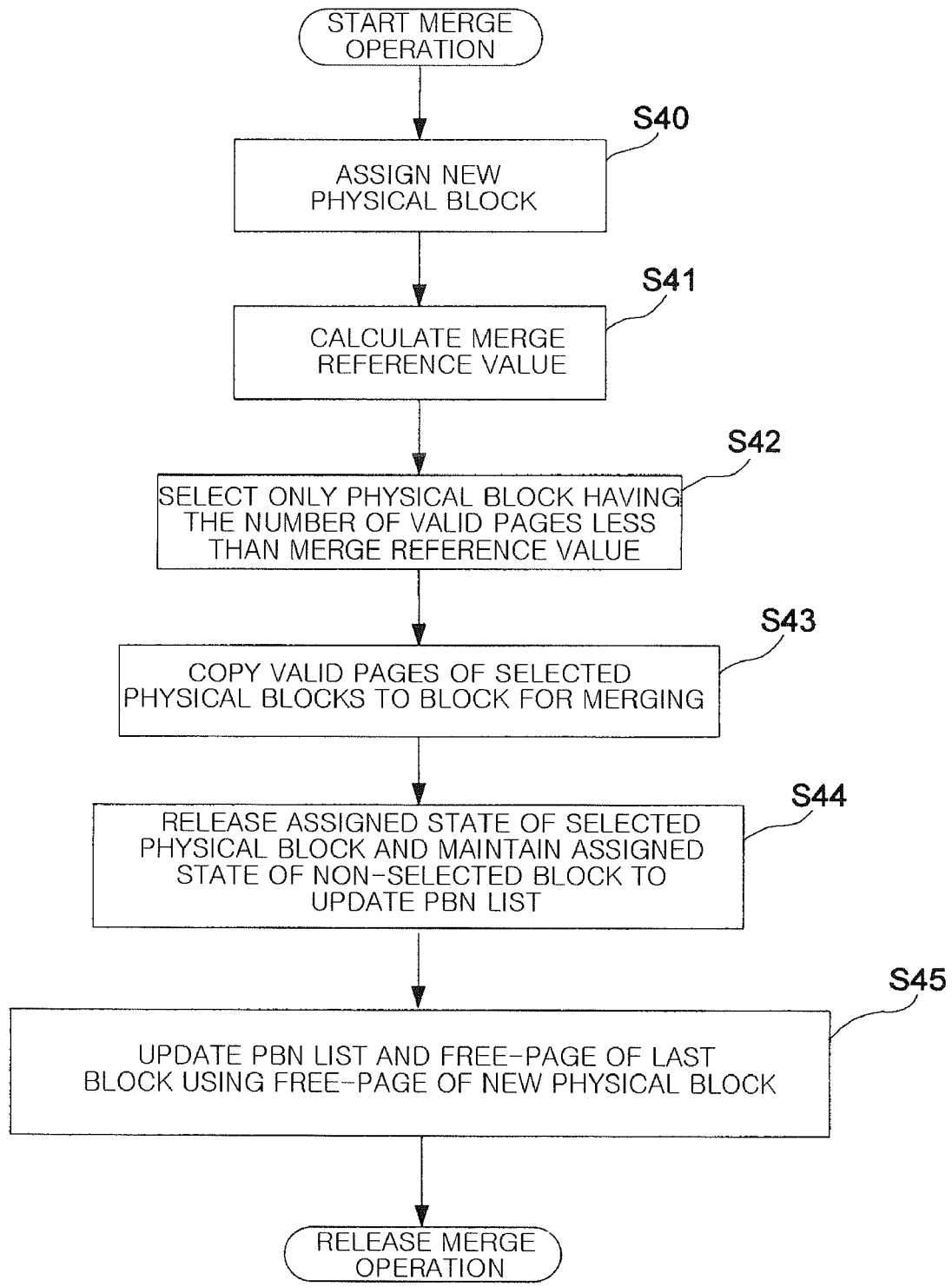
FIG. 8 is a view explaining a merging method of the log-based FTL of FIG. 4.

Also, when there is no more free-page in the physical block5 on which the writing operation has been performed and a maximum assignment number of physical blocks is already assigned for an LBN=1, the merge operation of FIG. 8 is performed, and the blockmap is updated using a PBN and a PPN reflecting the merge results.

Also, for S24, the log-based FTL 410 calculates a physical block and a physical page on which a writing operation has been performed, and updates a PBN=5 and a PPN-2 thereof on the pagemap1.

Consequently, when a command of "Read LSN5" is generated afterward, the log-based FTL 410 calculates a PBN=5 and a PPN=2 on which a writing operation has been performed through S22 with reference to an updated pagemap1. Also, the log-based FTL 410 reads data stored in a physical page2 of a physical block5 having the calculated PBN=5 and PPN=2 to output the same to the file system 120.

FIG. 7 is a view explaining a pagemap forming method of the log-based FTL of FIG. 4. FIG. 7 explains using as an example a method for forming a pagemap1 corresponding to a LBN=1.

When a reading operation for an LBN=1 is performed for the first time or after a long time and a pagemap1 corresponding to the LBN=1 is absent, the log-based FTL 410 calculates all of physical block0, block2, block3, and block5 sequentially assigned for an LBN=1 with reference to a blockmap first (S30).

Mapping relation between a physical page and a logical page is analyzed for each of the physical block0, block2, block3, and blocks (S31).

When a plurality of physical blocks correspond to one logical page in S31, only a logical page corresponding to a physical page on which a writing operation has been performed most recently is obtained for analysis of mapping relation between the physical page and the logical page. For example, a physical block3 selects only a physical page2 set as a valid page of the physical page0, page1, and page2 corresponding to a logical page1 to calculate mapping relation between a PBN=3 and an LPN=1.

Also, when the plurality of physical block0, block2, block3, and block5 sequentially assigned for an LBN=1 in reverse order of a PBN list, a PPN corresponding to each LPN is obtained to generate pagemap1 having the obtained data (S32).

That is, physical blocks are analyzed in the order of a block5, a block3, a block2, and a block0 to confirm that the block5 has a PPN=1 corresponding to an LPN=3, the block3 has a PPN=2 corresponding to an LPN=1, the block2 has a PPN=1 10 corresponding to an LPN=2, and the block0 has a PPN=2 corresponding to an LPN=0 (S32). Also, the confirmation results are put together to generate a pagemap1 including a PPN=2 and a PBN0 corresponding to an LPN=0, a PPN=2 and a PBN3 corresponding to an LPN=1, a PPN=1 and a PBN2 corresponding to an LPN=2, and a PPN=1 and a PBN5 corresponding to an LPN=3.

FIG. 8 is a view explaining a merging method of the log-based FTL of FIG. 4. FIG. 8 explains using as an example a merge operation for an LBN=1.

When there is no more free-page within a physical block on which a writing operation has been performed and a maximum assignment number of physical blocks is already assigned for an LBN=1, a new physical block corresponding to the LBN=1 is assigned first (S40), and the number of physical pages provided to each of the assigned physical blocks is divided by a maximum assignment number to obtain a merge reference value (S41).

Only a physical block of the physical blocks assigned for an LBN=1 that has the number of valid pages less than the merge reference value is selected (S42), and the valid page of the selected physical block is copied to a free-page of a new physical block. Also, when the coping is completed, an erasing operation for the selected physical block is performed (S43).

When S43 is completed, an assigned state between the LBN=1 and the selected physical block is released, and an assigned state between the LBN=1 and a non-selected physical block is maintained, so that a PBN list of the LBN=1 is updated (S44).

Last, a new physical block is set to a last Logblock of the PBN list, and a free-page of the new physical block is set to a free-page of the last physical block, so that the blockmap is updated (S45).

A log-based FTL and an operating method thereof according to the present invention provide a plurality of pagema corresponding to a plurality of logical blocks, respectively, and one blockmap to allow a physical block and a physical page having a physical address corresponding to a logical address to be calculated at a time, so that the unnecessarily increasing number of reading, writing, and erasing operations is reduced.

Also, according to the present invention, not all in the PBN list, only physical blocks that have little valid pages are selected even during a merge operation, so that the number of reading, writing, and erasing operations for a merge operation is reduced.

Consequently, the log-based FTL and an operating method thereof according to the present invention not only improve performances of reading and writing operations, but also increase the lifetime of a flash memory as a result of reducing space of a flash memory to do unnecessary operation.

While the present invention has been shown and described in connection with the preferred embodiments, it will be apparent to those skilled in the art that modifications and variations can be made without departing from the spirit and scope of the invention as defined by the appended claims.

What is claimed is:

1. An operating method for a log-based flash translation layer (FTL), the method comprising:
   if a reading operation for a logical block number (LBN) and a logical page number (LPN) is requested, obtaining a physical block number (PBN) and a physical page number (PPN) corresponding to the LBN and the LPN from a pagemap corresponding to the LBN, and accessing a physical page of a physical block corresponding to the PBN and the PPN to perform the reading operation; and
   if a writing operation for the LBN and the LPN is requested, obtaining a PBN of a physical block assigned for a previous writing operation for the LBN and a PPN of a free-page of the physical block assigned to the previous write operation from a blockmap, and accessing the obtained free-page of the physical block assigned to perform the writing operation,
   wherein the pagemap stores a PBN and a PPN corresponding to each of a plurality of LPNs subjected to the LBN, and the blockmap stores a PBN list of physical blocks assigned in previous writing operations for each LBN and a PPN of a free-page of a physical block assigned in the previous writing operations for each LBN.

2. The method according to claim 1, wherein the performing of the reading operation comprises analyzing physical blocks assigned for an LBN in reverse order of a PBN list of the LBN stored in the blockmap to form a pagemap corresponding to the LBN if there is no pagemap corresponding to the LBN.

3. The method according to claim 2, wherein a plurality of physical blocks is sequentially assigned for the LBN, wherein the forming of the pagemap comprises:
   finding the physical blocks sequentially assigned for the LBN using the PBN list stored in the blockmap; and
   calculating LPNs for each physical block; and
   calculating a PPN corresponding to each LPN for each physical block; and
   confirming a PPN and a PBN of the physical block including the physical pages corresponding to a plurality of LPNs, respectively, subjected to the LBN while scanning the physical blocks in reverse order of the PBN list, and putting the conformation results together to form the pagemap corresponding to the LBN.

4. The method according to claim 3, wherein the calculating of the PPN corresponding to each LPN for each physical block comprises obtaining a PPN of a physical page on which a writing operation has been performed most recently when a plurality of physical pages correspond to one LPN.

5. The method according to claim 1, wherein the performing of the writing operation further comprises:
   updating the PBN and the PPN of the physical page of the physical block on which the writing operation has been performed on the pagemap corresponding to the LBN; and
   obtaining a new free-page from the physical block on which the writing operation has been performed, or assigning a new physical block and obtaining the new free-page from the new physical block, to update a PBN and a PPN of the new free-page on the blockmap.

6. The method according to claim 5, wherein the updating of the PBN and the PPN of the new free-page on the blockmap comprises:
   updating the new free-page into the free-page of the physical block last assigned if the new free-page is obtained from the physical block on which the writing operation has been performed; and
   if there is no more free-page within the physical block on which the writing operation has been performed, assigning the new physical block into the physical block last assigned on the blockmap, obtaining the new free-page from the new physical block, and updating the new free-page into the free-page of the physical block last assigned on the blockmap.

7. The method according to claim 6, wherein the updating of the PBN and the PPN of the new free-page on the blockmap further comprises:
   if there is no free-page within the physical block on which the writing operation has been performed, and a maximum assignment number of physical blocks have been assigned for the LBN, assigning the new physical block, merging the new physical block with the physical blocks assigned for the LBN, and updating the PBN and the PPN of the new free-page on the blockmap.

8. The method according to claim 7 wherein the merging comprises:
   if there is no free-page within the physical block on which the writing operation has been performed, and a maximum assignment number of the physical blocks have been assigned for the LBN, assigning the new physical block;
   dividing the number of physical pages subjected to the new physical block by the maximum assignment number to calculate a merge reference value;
   selecting a physical block of the physical blocks sequentially assigned for the LBN that has valid pages less than the merge reference value;
   copying the valid pages of the selected physical block to free-pages of the new physical block, and performing an erasing operation on the selected physical block; and
   releasing an assigned state between the selected physical block and the LBN, setting the new physical block to the physical block last assigned for the LBN, and setting a free-page of the new physical block to the free-page of the physical block last assigned.

9. The method according to claim 1, wherein the PPN of the free-page of the physical block stored in the blockmap identifies a storage location wherein to perform the write operation.

10. The method according to claim 9, wherein the writing operation further comprises writing data in the accessed free-page.

11. A log-based flash translation layer comprising:
   a plurality of pagemaps generated to correspond to a plurality of logical block numbers (LBNs), respectively, to store physical block numbers (PBNs) and physical page numbers (PPNs) corresponding to respective logical page numbers (LPNs) subjected to the corresponding LBNs;
   a blockmap configured to store a PBN list of physical blocks sequentially assigned in previous writing operations for each LBN and a PPN for a free-page of a physical block last assigned in the previous writing operations for each LBN; and
   a processor configured to perform an address translation operation based on the pagemap during a reading operation, and perform an address translation operation based on the blockmap during a writing operation.

12. The log-based flash translation layer according to claim 11, wherein the physical block last assigned is a block on which a writing operation is to be performed, and the free-page is a physical page storing no data.

13. The log-based flash translation layer according to claim 11, wherein the processor divides a logical sector number provided by a file system by the number of logical blocks to obtain an LBN and an LPN, obtains a PBN and a PPN corresponding to the LPN from the pagemap corresponding to the LBN, and accesses a physical page of a physical block having the PBN and PPN corresponding to the LPN during the reading operation.

14. The log-based flash translation layer according to claim 13, wherein the processor analyzes the physical blocks sequentially assigned for the LBN in reverse order of the PBN list stored in the blockmap to confirm PPNs and PBNs of physical blocks including physical pages corresponding to a plurality of LPNs subjected to the LBN, and puts the confirmation results together to form a pagemap corresponding to the LBN when there is no pagemap corresponding to the LBN during the reading operation.

15. The log-based flash translation layer according to claim 11, wherein the processor divides a logical sector number by the number of logical blocks to obtain an LBN, obtains a PBN and a PPN of a free-page corresponding to the LBN from the blockmap, and accesses the free-page corresponding to the PBN and PPN during the writing operation.

16. The log-based flash translation layer according to claim 15, wherein the processor updates the PBN and the PPN of the physical page on which the writing operation has been performed on the pagemap corresponding to the LBN.

17. The log-based flash translation layer according to claim 15, wherein the processor obtains a new free-page from the physical block on which the writing operation has been performed, or assigns a new physical block and obtains a free-page from the new physical block to update a PBN and a PPN of the new free-page on the blockmap.

18. The log-based flash translation layer according to claim 17, wherein when there is no free-page within the physical block on which the writing operation has been performed, and a maximum assignment number of the physical blocks are assigned for the LBN, the processor assigns the new physical block, merges the new physical block with the physical blocks assigned for the LBN, and updates the PBN and the PPN of the new free-page on the blockmap.

19. The method according to claim 9, wherein the blockmap is configured to store a PBN of a physical block that is accessed for the immediately preceding write operation for the LBN and a PPN of a free-page of the physical block accessed for the immediately preceding write operation.

20. The log-based flash translation layer according to claim 11, wherein a writing operation for each LBN is performed to write data in the free-page using the PBN and the PPN of the free-page stored in the blockmap.

* * * * *